Figure 1:
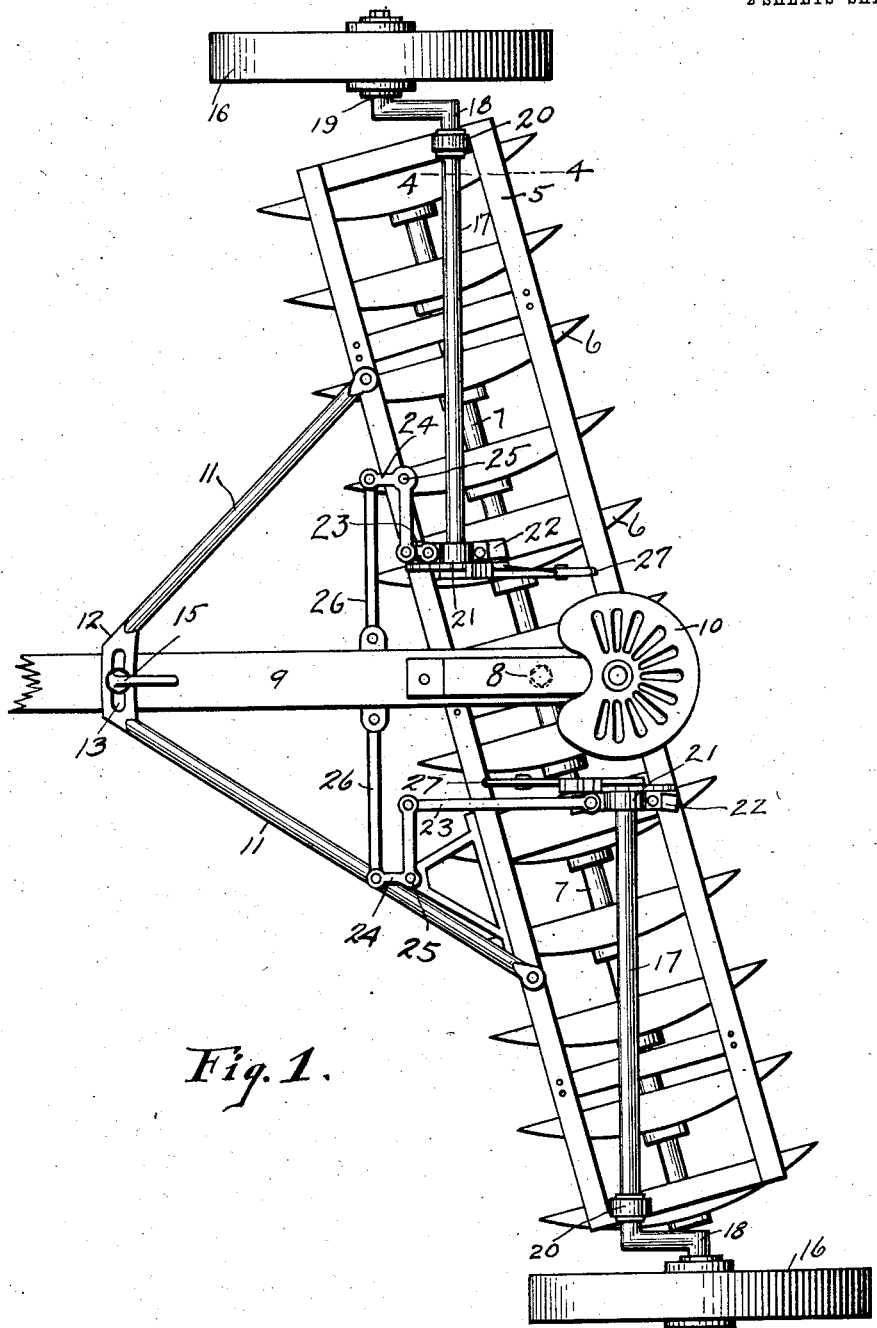

G. SMITH.
DISK HARROW.
APPLICATION FILED APR. 4, 1910.
1,011,385.
Patented Dec. 12, 1911.
2 SHEETS—SHEET 2.
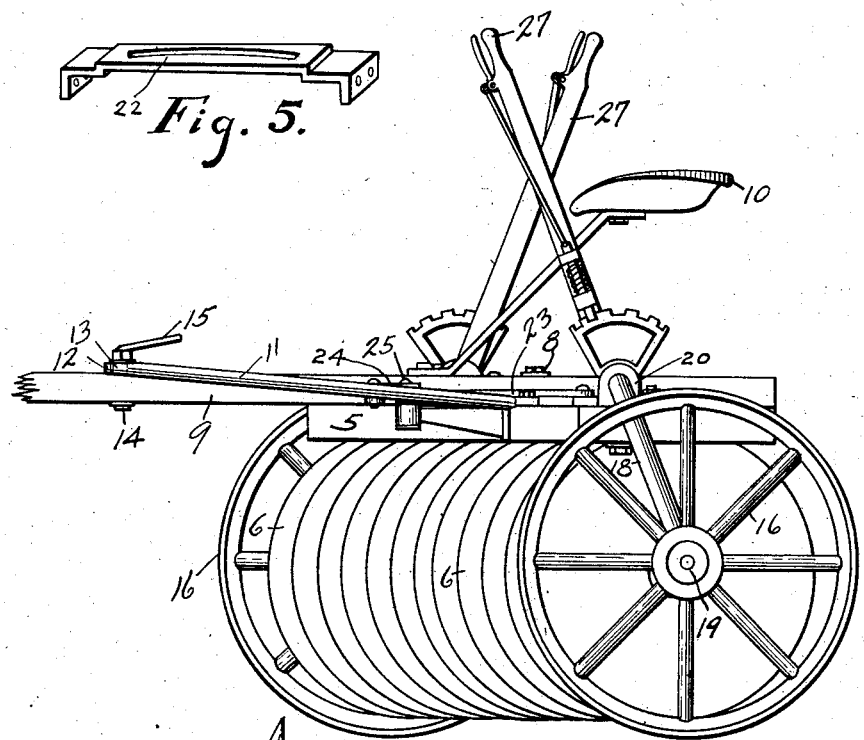

UNITED STATES PATENT OFFICE.

GREENE SMITH, OF SPOKANE, WASHINGTON.

DISK HARROW.

1,011,385.   Specification of Letters Patent.   Patented Dec. 12, 1911.

Application filed April 4, 1910. Serial No. 553,195.

*To all whom it may concern:*

Be it known that I, GREENE SMITH, a citizen of the United States, residing at Spokane, in the county of Spokane and State of Washington, have invented certain new and useful Improvements in Disk Harrows, of which the following is a specification.

The purpose of this invention is to provide a disk harrow that will throw the soil in one direction and avoid side thrust or creeping, thereby obviating the objection and annoyance to harrows of this character. This is effected by adjusting the angle of the disks according to their concavity, so that they will assume a natural balance, thereby overcoming all side thrust or creeping; or, in other words, the disks are adjusted to such an angle that when in the soil the pressure on the front or concave sides of the disks from lifting and throwing the same, is counterbalanced by the pressure of the soil on the rear or convex sides of the disks.

The invention also has for its object to provide improved means whereby the wheels of the machine will be automatically held parallel to each other and to the tongue.

In order that the invention may be better understood, reference is had to the accompanying drawings, in which:

Figure 1 is a plan view of the machine. Fig. 2 is a side elevation. Fig. 3 is a diagram illustrating the method of finding the angle at which the disks should be set. Fig. 4 is a section on the line 4—4 of Fig. 1. Fig. 5 is a perspective view of a guide hereinafter referred to.

In the drawings, 5 denotes the main frame of the harrow. This frame carries a gang of disks 6 mounted on a shaft 7 supported beneath the frame in any suitable manner. The frame has, midway between its ends, a pivotal connection 8 with the draft tongue 9, and the butt-end of the latter carries the driver's seat 10. The frame extends at an oblique angle to the tongue, which places the disks at a corresponding angle to the line of draft. Braces 11 extend forwardly and convergingly from the frame 5, on opposite sides of the tongue, the outer ends of said braces being connected by a slotted portion extending across the top of the tongue. Through the slot 13 of the part 12, and through the tongue passes a bolt 14 carrying, above the part 12, a hand nut 15 which, when screwed down against the part 12, securely locks the frame in adjusted position. The slot is an arc having for its center the pivot 8.

The frame 5 is supported at its ends on wheels 16, a separate axle 17 being provided for each wheel so that one wheel may be operated independently of the other, for a purpose to be presently described. The outer ends of the axles are formed with crank bends 18 which carry the spindles 19 on which the wheels are mounted.

The axles are located on opposite sides of the tongue, and each axle is supported, near its outer end, in a bearing 20, which is pivoted on the frame 5 so that it may swing in a horizontal plane, and the inner end of each axle is supported in a bearing 21 which is slidably mounted in a segmental guide 22 mounted on the frame 5. To the bearing 21 of each axle is connected one end of a link 23, the other end of which is connected to one arm of a bell crank lever 24 fulcrumed on the frame 5 at 25, and having its other arm connected by a link 26 to the tongue in front of the frame. The respective links 26 are connected to opposite sides of the tongue.

By the herein described pivoted supports for the axles, and the connections with the tongue, the two wheels are always kept parallel to each other, and to the tongue, the wheels moving in parallelism with the tongue when the latter is swung on the pivot 8.

To the inner ends of the axles are secured hand levers 27 which are provided for rocking the axles in their bearings, and which movement of the axles, through the crank portions 18, lowers the frame 5 relatively to the wheel, thus letting the disks down into the ground and gaging the depth they are to enter the soil. When the machine is being taken from one field to another, or is in transit, the frame is elevated until the disks rise above the ground.

Inasmuch as one axle may be operated as herein described independently of the other, either side of the machine may be raised or lowered, which is an important feature and very necessary when working on side hills, and uneven ground.

To find the correct angle at which the disks should set, I have devised the method illustrated diagrammatically in Fig. 3. This method is carried out as follows: Erect a line A perpendicular to the rim of the disk, and passing through its center or axis. From the point where this line meets the curved side of the disk, a chord B is drawn to the edge of the disk. This chord is bisected, and a line C perpendicular to the chord is drawn from the point of bisection to the line A. The point of meeting of the lines A and C is the vertex of an angle X which will be the proper angle at which the disks should be set. Experiments have demonstrated the correctness of this method, no matter what size the disks may be, or the amount of dish which they may have, and if the disks are set to an angle found as described, the soil will be properly turned, and the machine is perfectly balanced. The angle is directly proportionate to the concavity of the disks, or, in other words, the greater the concavity of the disks, the greater will be the angle. However, there are certain conditions like side hills or uneven ground, where the disks set at this angle may not just balance the machine, and in order to obtain this balance, there is provided the adjustable connection between the frame and the tongue as has been already described. A new adjustment within the limit of the slot 13 can be readily made, upon loosening the hand nut 15, the wheels automatically readjusting themselves to remain parallel to the tongue as already described.

I claim:

1. A disk harrow comprising a frame carrying a gang of disks, a draft tongue having a pivotal connection with the frame, means for locking the tongue and frame together, wheels supporting the frame, independent axles for said wheels, bearings on the frame for the axles, one of the bearings of each axle being pivoted to the frame to permit a horizontal swinging movement of the axles, and the other bearing of each axle being slidably mounted on the frame, a guide on the frame for the last-mentioned bearings, and connections between said last-mentioned bearings and the tongue.

2. A disk harrow comprising a frame carrying a gang of disks, a draft tongue having a pivotal connection with the frame, means for locking the tongue and frame together, horizontally swinging axles carried by the frame on opposite sides of the tongue, wheels carried by one end of the axles, bell-crank-levers fulcrumed on the frame, connections for the other ends of the axles and the bell-crank-levers, and connections between the bell-crank-levers and the tongue on opposite sides of the latter.

In testimony whereof I affix my signature in presence of two witnesses.

GREENE SMITH.

Witnesses:
JOHN PATTISON,
FRANK H. BROWN.